(12) United States Patent
Seo

(10) Patent No.: US 9,937,409 B2
(45) Date of Patent: Apr. 10, 2018

(54) WHEEL IN WHICH HETEROGENEOUS MATERIAL IS INSERTED

(71) Applicant: Jeong Sun Seo, Seoul (KR)

(72) Inventor: Jeong Sun Seo, Seoul (KR)

(73) Assignees: Jin Young Seo, Seoul (KR); Sung Hoon An, Seoul (KR); Ji Hoon An, Seoul (KR); Ho Seok Seo, Seoul (KR); Ji Eun Lee, Incheon (KR); Woong Jun Lee, Geoje (KR)

( * ) Notice: Subject to any disclaimer, the term of this patent is extended or adjusted under 35 U.S.C. 154(b) by 61 days.

(21) Appl. No.: 14/908,578

(22) PCT Filed: Jun. 18, 2014

(86) PCT No.: PCT/KR2014/005368
§ 371 (c)(1),
(2) Date: Jan. 29, 2016

(87) PCT Pub. No.: WO2015/020310
PCT Pub. Date: Feb. 12, 2015

(65) Prior Publication Data
US 2016/0184691 A1    Jun. 30, 2016

(30) Foreign Application Priority Data

Aug. 9, 2013 (KR) ........................ 10-2013-0095059

(51) Int. Cl.
*A63C 17/22* (2006.01)
*B60B 33/00* (2006.01)
*B60B 5/02* (2006.01)

(52) U.S. Cl.
CPC ............ *A63C 17/22* (2013.01); *A63C 17/223* (2013.01); *B60B 33/0028* (2013.01);
(Continued)

(58) Field of Classification Search
CPC ..... B60C 7/22; A63C 17/0033; A63C 17/006; A63C 17/014; A63C 17/22; A63C 17/223; B60B 33/0028
(Continued)

(56) References Cited

U.S. PATENT DOCUMENTS 2,241,684 A * 5/1941 Ware .................... A63C 17/22
                                                     301/5.307
2,316,498 A * 4/1943 Biczak, Jr. ............ A63C 17/22
                                                     301/5.7
(Continued)

FOREIGN PATENT DOCUMENTS

JP      51-104075 U     8/1976
KR  10-2005-0017495 A   2/2005
(Continued)

OTHER PUBLICATIONS

International Search Reporting for PCT/KR2014/005368 dated Sep. 30, 2014.

*Primary Examiner* — Kip T Kotter
(74) *Attorney, Agent, or Firm* — STIP Law Group, LLC

(57) ABSTRACT

A wheel includes a primary ring having a stepped core part and a tire formed of a urethane material as an outer surface thereof, and an auxiliary ring provided on a circumferentially-central portion of the primary ring, on which the tire is provided, in an insertion manner. The primary ring is formed of a plastic material, and the auxiliary ring is formed of a metallic material that is different from the material of the primary ring.

6 Claims, 5 Drawing Sheets

(52) U.S. Cl.
CPC ............... *A63C 17/226* (2013.01); *B60B 5/02* (2013.01); *B60B 33/00* (2013.01); *B60B 2200/47* (2013.01); *B60B 2360/10* (2013.01); *B60B 2360/102* (2013.01); *B60B 2360/104* (2013.01); *B60B 2360/108* (2013.01); *B60B 2360/324* (2013.01); *B60B 2900/30* (2013.01); *B60B 2900/311* (2013.01)

(58) Field of Classification Search
USPC ....................................................... 301/5.308
See application file for complete search history.

(56) References Cited

U.S. PATENT DOCUMENTS

| | | | | |
|---|---|---|---|---|
| 4,666,169 | A | * | 5/1987 | Hamill ............... A63C 17/0086 280/11.223 |
| 5,470,086 | A | * | 11/1995 | Peterson ................ A63C 17/06 280/11.223 |
| 6,227,622 | B1 | * | 5/2001 | Roderick .............. A63C 17/223 152/323 |
| 6,592,189 | B1 | * | 7/2003 | Back, Sr. ............... A63C 17/22 152/47 |
| 7,406,989 | B1 | * | 8/2008 | Casaus ................... B60B 3/001 152/323 |

FOREIGN PATENT DOCUMENTS

| | | |
|---|---|---|
| KR | 10-2005-0051926 A | 6/2005 |
| WO | 97-45276 A1 | 12/1997 |

* cited by examiner

-- Prior Art --

WHEEL IN WHICH HETEROGENEOUS MATERIAL IS INSERTED

CROSS-REFERENCE TO RELATED APPLICATIONS

This application is the U.S. National Phase under 35 U.S.C. § 371 of International Application No. PCT/KR2014/005368 filed on Jun. 18, 2014, which in turn claims the benefit of Korean Application No. 10-2013-0095059, filed on Aug. 9, 2013, the disclosures of which are incorporated by reference into the present application.

TECHNICAL FIELD

The present invention relates generally to a wheel in which a heterogeneous material is inserted and, more particularly, to a wheel having a structure in which an auxiliary ring formed of a metallic material is inserted into and coupled to a primary ring formed of a plastic material.

BACKGROUND ART

Generally, representative equipment of leisure sports includes, for example, roller-skates, inline-skates, skateboards, essboards, kickboards, or the like, which are equipped with wheels formed of urethane to enjoy speed. Such leisure sporting equipment has a structure in which wheels are installed onto boots or boards to roll over the ground. Among the equipment having such a structure, a wheel of an inline skate will be exemplarily explained as follows. First, an inline skate has a structure in which a curved frame is provided on a lower portion of a boot, a plurality of coupling holes are formed in opposite sides of the frame, and a plurality of wheels are rotatably installed onto coupling axes inserted through the coupling holes. Such inline skates have been widely used by various age groups from children to the older adults, and they are especially popular as family leisure sporting equipment.

FIG. 1 is an exploded perspective view of the configuration of a conventional wheel for skates. As shown in FIG. 1, the wheel includes a hub section 10 and a urethane tire formed around the hub section 10. The hub section 10 has an inner ring portion 11, an outer rim portion 12, and a plurality of spokes 13 radially extending between the inner ring portion 11 and the outer rim portion 12. Two bearings 31 are installed in the inner ring portion of the hub section 10 with a cylindrical spacer member 32 disposed therebetween. A fastening bolt 33 is inserted through both the bearings 31 and the spacer member 33 disposed therebetween, and is coupled to a base frame on opposite side thereof through coupling holes and fastened thereto with a nut 34, thereby forming an assembly. In such a wheel, the hub section 10, which has the inner ring portion 11, the outer rim portion 12, and the spokes 13, is formed of a light plastic material. Such a wheel, however, has limitations in increasing a rotational speed for skating. As an example, Korean Unexamined Patent Publication No. 10-2010-0137246 (published on Dec. 30, 2010) discloses such a wheel for skates.

DISCLOSURE

Technical Problem

Accordingly, the present invention has been made keeping in mind the above problems occurring in the related art, and an object of the present invention is to provide a wheel having a structure in which an auxiliary ring formed of a metallic material is inserted into and coupled to a primary ring formed of a plastic material, thereby increasing a rotation speed of the wheel due to a local mass increase, which is caused by the insertion of the metallic material into the wheel, at the same volume by using the difference in specific gravity (density).

Another object of the present invention is to provide a wheel having a structure in which an auxiliary ring formed of a metallic material is inserted into and coupled to a primary ring formed of a plastic material, thereby facilitating the variation of mass compared to a conventional structure formed of a single material through the difference in specific gravity (density) between the primary ring and the auxiliary ring, thereby further improving driving performance.

Technical Solution

In order to accomplish the above objects, according to an aspect of the present invention, a wheel includes: a primary ring having a body portion, a stepped core part, and a protruded portion; a tire formed of a urethane material, wherein the body portion is located at an outside of the stepped core part along the radial direction and the protruded portion is located at an outside of the body portion along the radial direction; and an auxiliary ring provided on a circumferentially-central portion of the primary ring, in an insertion manner, wherein the primary ring is formed of a plastic material, and the auxiliary ring is formed of a metallic material that is different from the material of the primary ring.

The auxiliary ring and the primary ring may have a difference in specific gravity (density) and the metallic auxiliary ring may be coupled to the primary ring so as to increase a rotation speed of the wheel due to a local mass increase at the same volume.

The primary ring may be provided with a protruded portion in which the auxiliary ring is inserted into and coupled to along a circumferentially-central portion of an outer surface of the recess, wherein the auxiliary ring protrudes farther than the protruded portion.

The primary ring may be configured such that the auxiliary ring is integrally embedded inside the circumferentially-central portion of the primary ring.

The auxiliary ring may be formed of any one material selected from the group including steel, aluminum, tungsten, brass, titanium, and stainless steel.

The wheel in which the auxiliary ring is disposed in the primary ring may be used for extreme sports, inline-skating, skateboarding, essboarding, kickboarding, or the like.

Advantageous Effects

According to the present invention, the wheel is configured such that the auxiliary ring formed of a metallic material is inserted into and coupled to the primary ring formed of a plastic material, thereby increasing a rotation speed of the wheel due to a local mass increase, which is caused by the insertion of the metallic material into the wheel, at the same volume by using the difference in specific gravity (density).

According to the present invention, such a configuration facilitates the variation of mass compared to a conventional structure formed of a single material through the difference in specific gravity (density) between the primary ring and the auxiliary ring, thereby further improving driving performance.

Figure 1:
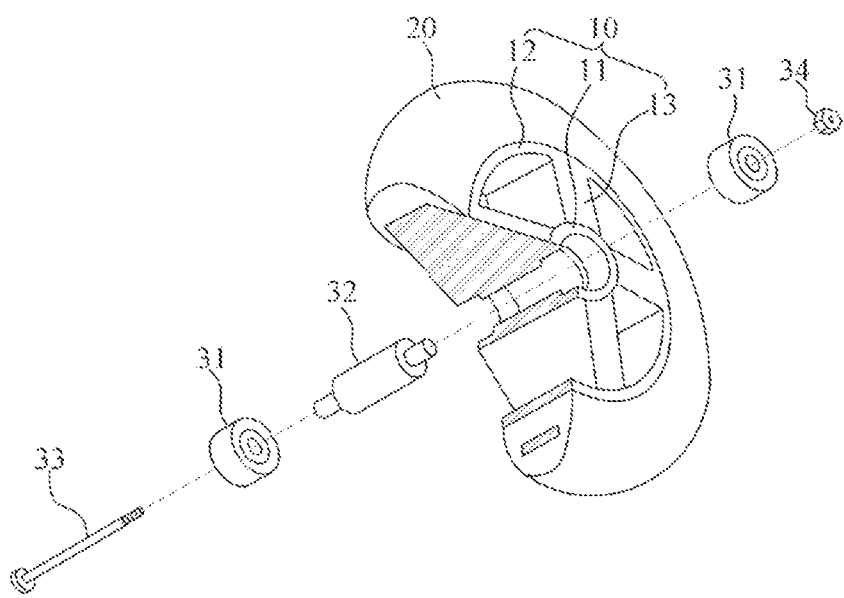
FIG. 1 is a perspective view of the configuration of a conventional wheel for skates.

<Description of the Reference Numerals in the Drawings>

| | |
|---|---|
| 10: Hub section | 11: Inner ring portion |
| 12: Outer rim portion | 13: Spoke |
| 20: Tire | 31: Bearing |
| 32: Spacer member | 33: Fastening bolt |
| 34: Nut | 101, 201: Tire |
| 110, 210: Primary ring | 111, 211: Core part |
| 112, 212: Protruded portion | |
| 113, 213: Body portion | |
| 120, 220: Auxiliary ring | |
| 112a, 212a: First annular recess | |
| 120a: Second annular recess | |

BEST MODE

Hereinbelow, preferred embodiments of the present invention will be described in detail with reference to the accompanying drawings in order to allow an ordinary skilled person in the art to easily implement the invention. In the following description, it is to be noted that, when the functions of conventional elements and the detailed description of elements related with the present invention may make the gist of the present invention unclear, a detailed description of those elements will be omitted. Further, the same reference numerals refer to similar elements throughout the drawings.

In addition, the expression 'the connection of a first element with a second element' may include embodiments in which the first and second elements are formed in direct contact, and may also include embodiments in which additional element may be formed between the first and second elements, such that the first and second elements may be connected indirectly. It will be further understood that the terms "comprises" and/or "comprising", or "includes" and/or "including", when used in this specification, specify the presence of stated features, but do not preclude the presence or addition of one or more other features.

Figure 2:
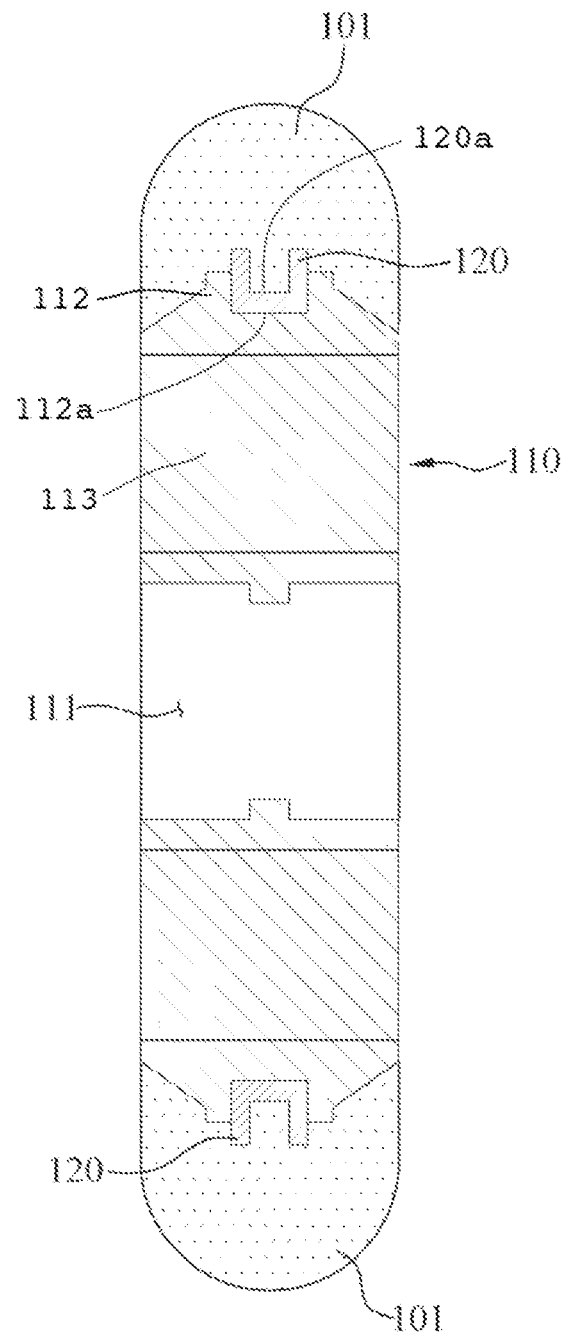
FIG. 2 is a cross-sectional view of a wheel having a heterogeneous material disposed therein according to an embodiment of the present invention.
Figure 3A:
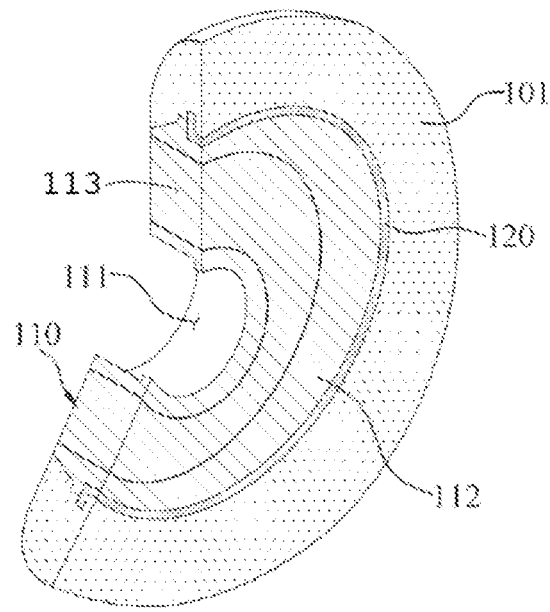
FIG. 3A and FIG. 3B are cross-sectional perspective views of the wheel having a heterogeneous material disposed therein according to the embodiment of the present invention.
Figure 3B:
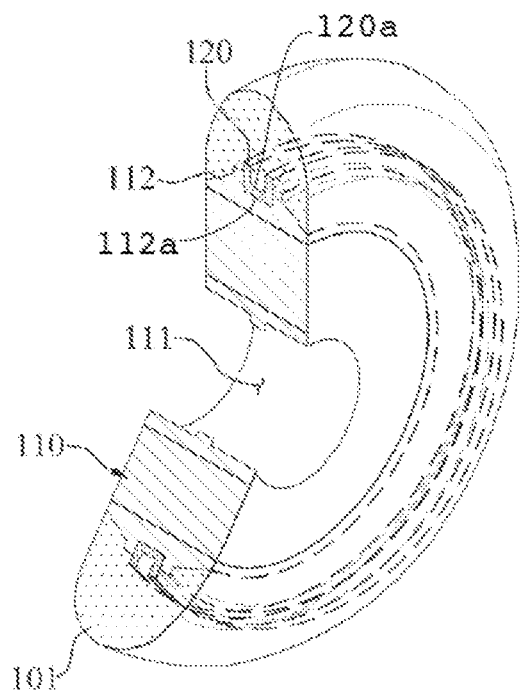

FIG. 2 is a cross-sectional view of a wheel having a heterogeneous material disposed therein according to an embodiment of the present invention, and FIG. 3A and FIG. 3B are cross-sectional perspective views of the wheel having a heterogeneous material disposed therein according to the embodiment of the present invention. As shown in FIGS. 2 and 3, a wheel having a heterogeneous material disposed therein may include a primary ring 110 and an auxiliary ring 120 according to an embodiment of the present invention.

Figure 4:
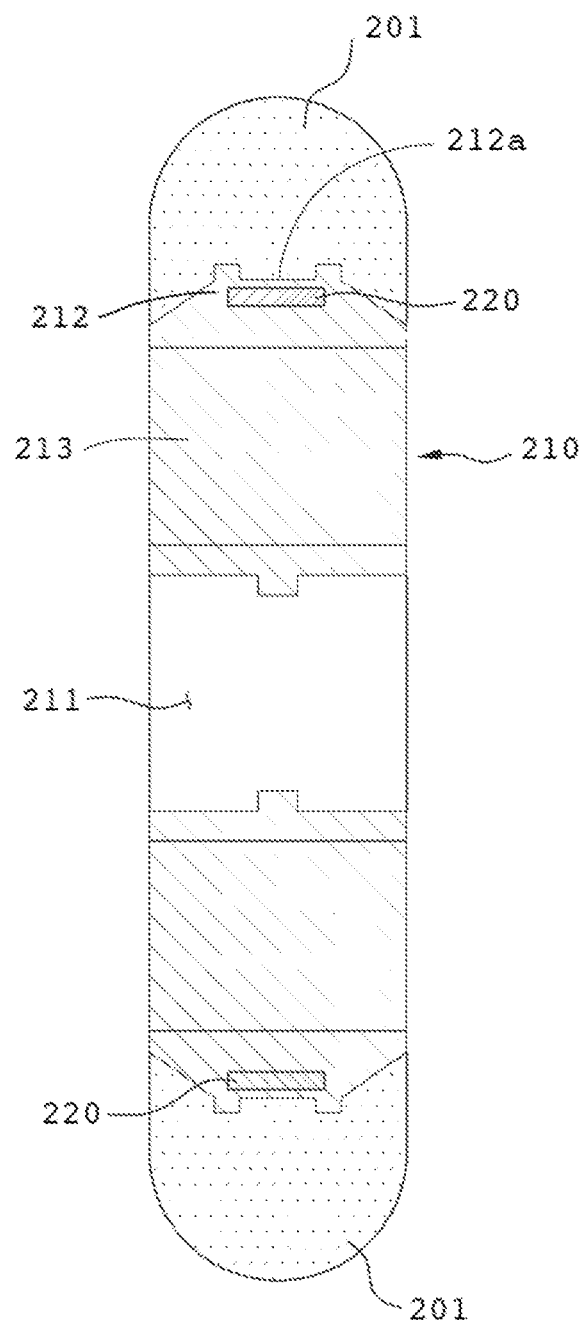
FIG. 4 is a cross-sectional view of a wheel having a heterogeneous material disposed therein according to another embodiment of the present invention.
Figure 5A:
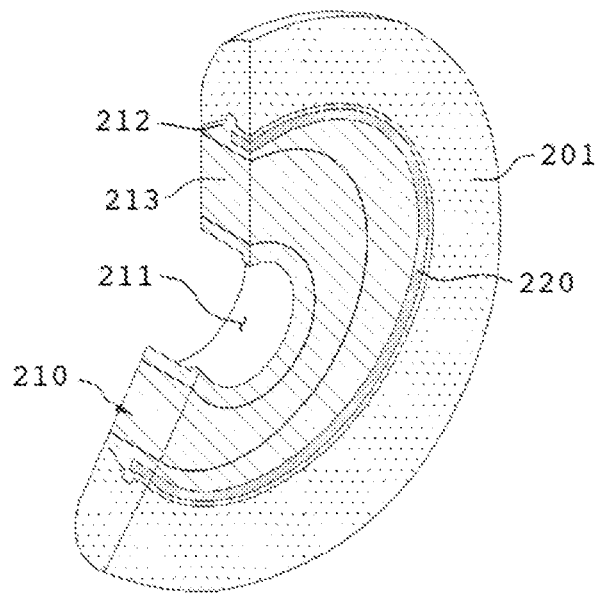
FIG. 5A and FIG. 5B are cross-sectional perspective views of the wheel having a heterogeneous material disposed therein according to the embodiment of the present invention.
Figure 5B:
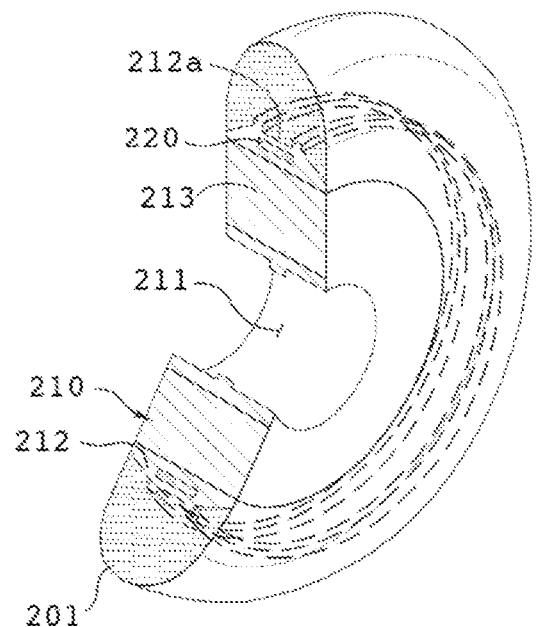

The primary ring 110 includes a stepped core part 111, a protruded portion 112, and a body portion 113. An urethane tire 101 covers an outer circumferential part of the primary ring. The primary ring 110 is formed of a plastic material, which is different from a metallic material of the auxiliary ring 120 to be described later. As shown in FIGS. 2 and 3, the primary ring 110 may include a protruded portion 112, in which the auxiliary ring 120 is inserted and coupled along a circumferentially central portion of the outer surface of the recess. Alternatively, as shown in FIGS. 4 and 5, the auxiliary ring 220 may be embedded inside the protruded portion 212 along the circumferentially central portion of the recess. In addition, as shown in FIG. 1, two bearings 31 and a cylindrical spacer member 32 are inserted into the core part 111, 211 of the primary ring, and a fastening bolt 33 is inserted through the bearings and spacer member and is fastened with a nut 34, thereby forming an assembly.

The auxiliary ring 120, 220 is provided along a circumferentially-central portion of the main body 110, 210, on which the tire 101, 201 is provided. The auxiliary ring 120, 220 may be formed of a metallic material that is different from the plastic material of the primary ring 110, 210. That is, the auxiliary ring 120, 220 may be formed of any one metallic material selected from the group including steel, aluminum, tungsten, brass, titanium, and stainless steel. In addition, as shown in FIGS. 2 and 3, the auxiliary ring 120 may be inserted into and coupled to the protruded portion 112 of the primary ring in such a manner that it protrudes farther than the protruded recess. Further, as shown in FIGS. 4 and 5, the auxiliary ring 220 may be embedded inside the protruded portion 212 along the circumferentially central portion of the recess.

According to the present invention, the wheel is configured such that the auxiliary ring 120, 220 and the primary ring 110, 210 have a difference in specific gravity (density), and the metallic auxiliary ring 120 is fixedly inserted into, or otherwise the metallic auxiliary ring 220 is integrally embedded inside the protruded recess of the primary ring, thereby increasing a rotation speed of the wheel due to a local mass increase at the same volume, which is caused by the insertion of the metallic material into the wheel. Such a configuration facilitates the variation of mass compared to a conventional structure formed of a single material through the difference in specific gravity (density) between the primary ring and the auxiliary ring, thereby further improving driving performance. That is, since a metallic material has higher specific gravity than a urethane material, when the metallic auxiliary ring is coupled to the urethane wheel, an increase in local mass occurs at the same volume, thereby increasing a rotation speed of the resultant wheel.

The wheel in which the auxiliary ring formed of a heterogeneous material is disposed in the primary ring can be used for extreme sports, inline-skating, skateboarding, essboarding, kickboarding, or the like.

FIG. 4 is a cross-sectional view of a wheel having a heterogeneous material disposed therein according to another embodiment of the present invention, and FIG. 5 is a cross-sectional perspective view of the wheel having a heterogeneous material disposed therein according to the embodiment of the present invention. The wheel shown in FIGS. 4 and 5 has the same configuration as that of the wheel shown in FIGS. 2 and 3, except for a position where the auxiliary ring 220 is provided. That is, in FIGS. 4 and 5, the auxiliary ring 220 is integrally embedded inside the protruded portion 212 along the circumferentially-central portion of the recess. That is, unlike the embodiment of FIGS. 2 and 3 in which the auxiliary ring 120 is inserted into and coupled to the protruded portion of the primary ring 110, in the present embodiment of FIGS. 4 and 5, the auxiliary ring 220 is embedded inside the circumferentially-central portion of the primary ring 210 by means of a die casting method. Here, in the case of insert-type coupling, the configuration may be such that, after the primary ring 110 is separated in a symmetrical manner, the auxiliary ring 120 is arranged, and then the separated primary ring 110 is coupled and assembled thereto.

The present invention disclosed herein may be diversely modified and applied by an ordinary person skilled in the art to which the present invention pertains, and the scope of technical spirit of the invention should be defined by the accompanying claims.

The invention claimed is:

1. A wheel comprising:
    a primary ring having a stepped core part, a body portion, and a protruded portion, wherein the body portion is an outside of the stepped core part along the radial direction and the protruded portion is an outside of the body portion along the radial direction;
    a tire formed of a urethane material and circumferentially covering the primary ring,
    wherein the protruded portion is radially skewed and protruded toward the tire and includes a first annular recess in an outermost center of the primary ring; and
    an auxiliary ring inserted either between the primary ring and the tire or inside the protruded portion,
    wherein the tire and/or the protruded portion completely surrounds the auxiliary ring,
    the primary ring is formed of a plastic material, and the auxiliary ring is formed of a metallic material.

2. The wheel of claim 1, wherein the auxiliary ring and the primary ring have a difference in specific gravity and density.

3. The wheel of claim 1, wherein the auxiliary ring is inserted between the primary ring and the tire and located in the first annular recess of the protruded portion and wherein the auxiliary ring includes a second annular recess on a circumferential portion of the auxiliary ring and protrudes toward the tire farther than the protruded portion.

4. The wheel of claim 1, wherein the auxiliary ring is inserted completely inside the protruded portion.

5. The wheel of claim 1, wherein the auxiliary ring is formed of any one material selected from the group including steel, aluminum, tungsten, brass, titanium, and stainless steel.

6. The wheel of claim 5, wherein the wheel is used for extreme sports, inline-skating, skateboarding, essboarding, or kickboarding.

* * * * *